April 29, 1941.  M. DUBELL  2,239,813

FISHING BOBBER

Filed Oct. 12, 1940

Inventor

Michael Dubell

By Clarence A. O'Brien

Attorney

Patented Apr. 29, 1941

2,239,813

UNITED STATES PATENT OFFICE 2,239,813

FISHING BOBBER

Michael Dubell, Chicago, Ill.

Application October 12, 1940, Serial No. 361,001

3 Claims. (Cl. 43—49)

The present invention relates to new and useful improvements in fishing bobbers and has for its primary object to provide an article of this character embodying means for adding to the buoyancy of the device.

A further important object of the invention is to provide novel means for attaching the line to the bobber.

Other objects and advantages reside in the details of construction as more fully hereinafter described and claimed, reference being had to the accompanying drawing forming part hereof, wherein like numerals refer to like parts throughout, and in which—

Figure 1:
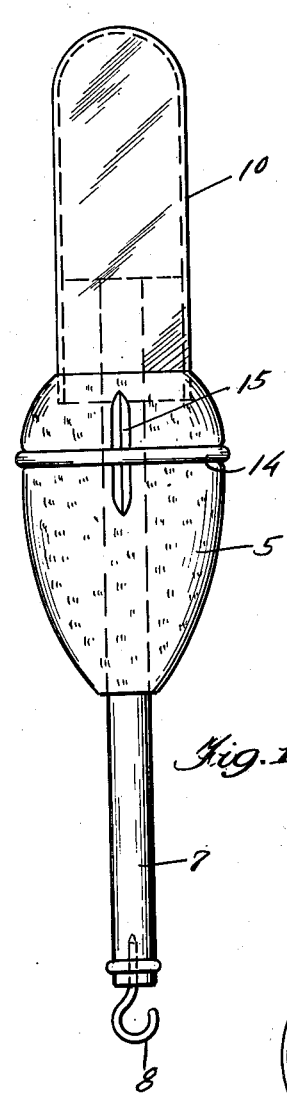
Figure 1 is a side elevational view.

Referring now to the drawing in detail, wherein for the purpose of illustration I have disclosed a preferred embodiment of the invention, the numeral 5 designates a cork body of substantially egg-shaped form and provided with a longitudinally extending bore 6 within which a wooden peg 7 is tightly fitted, one end of the peg projecting from the body and having a line attaching hook at its outwardly disposed end.

Figure 2:
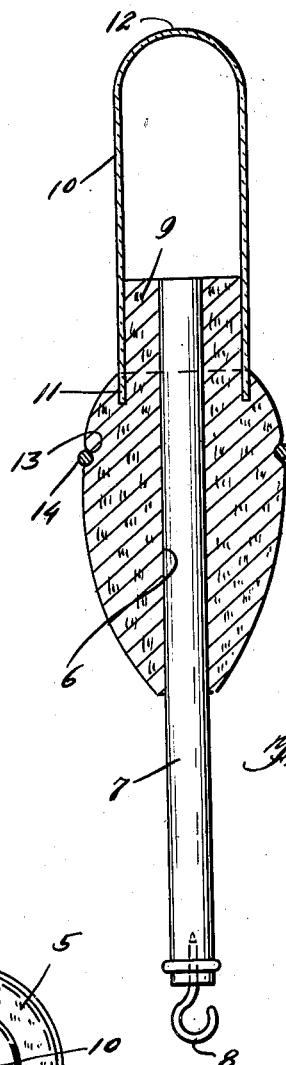
Figure 2 is a longitudinal sectional view.
Figure 3:
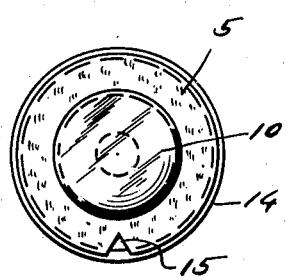
Figure 3 is a top plan view.

The other end of the body 5 is provided with a cylindrical extension 9 and over which is snugly fitted a tubular tip 10 preferably constructed of Celluloid, the inner end of the tip being embedded in the body as shown at 11 and the outer end of the tip being rounded and closed as shown at 10 and projecting above the top of the cylindrical extension 9 as shown to advantage in Figure 2 of the drawing.

Adjacent the upper portion of the body 5 is a circumferentially extending groove 13 within which is fitted a wire ring member 14 and intersecting the groove 13 is a vertically extending groove 15 adapted to accommodate the fish line which is retained in position in the groove under the ring 14.

In attaching the line the same is inserted through the groove 15 and wrapped one or more times around the hook 8, whereby the line will be anchored in position to the bobber.

The hollow tip 10 forms an air chamber in the upper portion thereof whereby to add to the buoyancy of the bobber, and to thus maintain the same in an upright position while floating on the water.

It is believed the details of construction, advantages and manner of use of the device will be readily understood from the foregoing without further detailed explanation.

Having thus described the invention, what I claim is—

1. A fishing bobber comprising a buoyant body, means projecting from the lower end of the body for attaching a fish line thereto, means at the side of the body for also attaching a fish line thereto, and a tubular member having one end embedded in the upper portion of the bobber and its other end closed and projecting above the bobber to provide an air chamber in said tubular member to add to the buoyancy of the bobber.

2. A fishing bobber comprising a buoyant body, means projecting from the lower end of the body for attaching a fish line thereto, means at the side of the body for also attaching a fish line thereto, and a tubular member of cellulose material having one end embedded in the upper portion of the body and with its other end closed and projecting above the body to provide an air chamber in said tubular member to add to the buoyancy of the bobber.

3. A bobber comprising a cork body, a stem having one end inserted in the body and extending downwardly therefrom, a line attaching device at the lower end of the stem, a line accommodating groove extending vertically in one side of the body, a ring member carried by the body and extending across said groove to retain the line in position therein, and means at the upper end of the body forming an air chamber therein to add buoyancy to the bobber.

MICHAEL DUBELL.